June 11, 1940.   T. G. HARE   2,204,355
VALVE SEAL
Filed March 10, 1939

INVENTOR.
Terence G. Hare
BY
Barnes, Kisselle, Laughlin & Raisch
ATTORNEYS

Patented June 11, 1940

2,204,355

UNITED STATES PATENT OFFICE 2,204,355

VALVE SEAL

Terence G. Hare, Windsor, Ontario, Canada

Application March 10, 1939, Serial No. 260,924

8 Claims. (Cl. 251—46)

This invention relates to a valve, particularly of the type for controlling the flow of water or other fluids such as compressed air or steam, and the invention aims to provide an improved structure which affords an antifriction bearing between the controlling stem and the sealing washer so that when the valve is closed the sealing washer is not rotated on the seat.

The principal objects of the invention are to provide an improved simplified structure which can be cheaply manufactured and furnished to the trade at a low cost, and which makes use of the standard form of valve structure and washer screw so that the existing washers in faucets already in use may be replaced by the antifriction mounting. Also, the invention aims to provide an improved assembly, to the end that the antifriction bearing elements and the races therefor are united in a single assembly which can be easily and quickly mounted in a valve or faucet. Other objects will become apparent as the detailed description progresses and which description is directed to the forms of the devices specifically illustrated herein.

Figure 1:
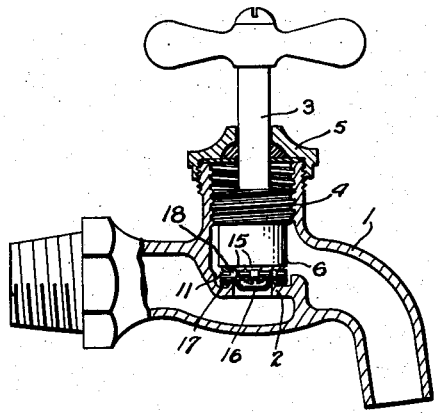
Fig. 1 is a cross sectional view of a faucet structure showing the valve arrangement incorporated therein.
Figure 2:
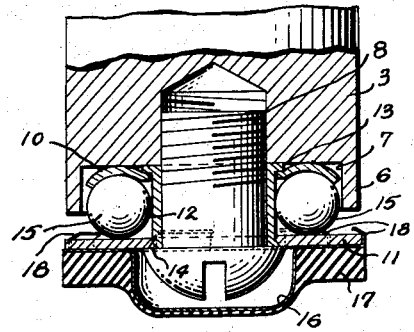
Fig. 2 is an enlarged cross sectional view showing the antifriction washer mounting.

In Fig. 1 a rather conventional faucet is illustrated at 1 having a seat 2 and a controlling valve stem 3 screw-threaded as at 4 into the body of the faucet and extending through a cap 5. As shown in Fig. 2, the lower end of the stem has a circumferential shoulder 6 defining a groove 7, in which the usual washer is placed. The conventional or usual screw is shown at 8.

The antifriction structure takes the form of an upper race 10 preferably of thin sheet metal and a lower race 11, also preferably of quite thin sheet metal for the purpose of minimizing the over-all axial dimension. A collet 12 passes centrally through the washer-like races and has a flange 13 which overlies the upper race. The lower end of the collet is peened over as at 14 to engage the lower race. Thus the collet holds the antifriction structure in assembly, with the ball bearings 15 disposed between the races. The peened over portion 14 may be only at spaced points on the collet, or may be a complete circumferential outward flanging or peening of this end of the collet.

Preferably the upper race, as illustrated, is curved to fit over the balls, as shown, and holds them in assembly, and the collet preferably takes a slight tension on the inner edge of the upper race so that the balls are snugly gripped. This is for the purpose of keeping the assembly comprising the races, balls and collet in tight or snug relationship so that when raised from the seat 2 there will be no vibration of these parts caused by the flow of fluid therethrough with attendant noises. In any event the vibration is minimized.

This structure is applied to the valve stem 3 with the usual screw 8 which may have therefore been used to hold an ordinary washer on the valve stem. The seal structure per se takes the form of a thin sheet metal cap 16 of disc form recessed so as to clear the head of the screw and having an outer portion for abutting against the lower race. The sealing member 17 in the form shown in Fig. 2 is vulcanized directly to the cap 16, and it has a thickened outer portion as illustrated to engage the seat, while a center portion preferably extends over the central recessed part of the cap but is of quite a thin structure. This is provided largely for the purpose of making the washer in the form of a disc to prevent fluid from getting in between the sealing member and the cap plate, although the central portion may not be used, in which event the sealing member will be in the form of a ring. The cap has fingers 18 projecting from its periphery, which are adapted to be bent over the peripheral edge of the lower race by the means of a suitable tool, and in this way the sealing member is held to the lower race. With this structure it will be seen that the screw has to be located before the washer is applied.

Figure 3:
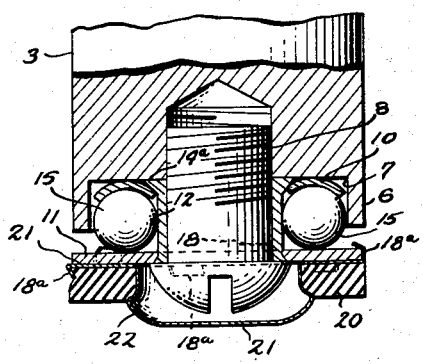
Fig. 3 is a cross sectional view similar to Fig. 2 showing a modified form.
Figure 4:
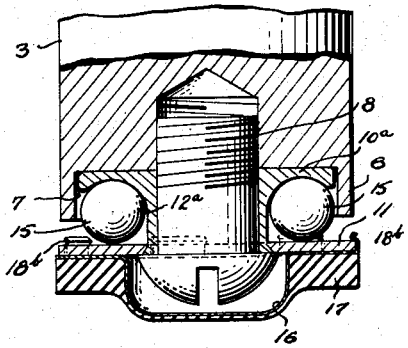
Fig. 4 is another cross sectional view showing a further modified form.

In the form shown in Fig. 3 the valve stem and antifriction bearing arrangement is substantially the same as that just described, and the same reference characters are applied to these parts. The portion 14a is of beveled form. In this form, however, the sealing member 20 is clamped to the cap plate 21. Every other one of the fingers 18a may be arranged to be fashioned downwardly and inwardly so as to bite into the sealing member, while the cap is preferably formed with an outwardly extending portion forming a shoulder 22. Thus the sealing member 20 is in the form of a ring clamped to the cap plate. In Fig. 4 the stem and anti-friction bearing structure is again substantially the same as the ones previously described, with the same reference characters applied thereto. In this form the fingers 18b are pre-formed so as to snap over the peripheral edge of the race 11. Also, in this form the sealing member 17 is like that shown in Fig. 2 and is vulcanized to the cap plate. However, the snap-on arrangement for the cap plate, as shown in Fig. 4, may be used with the clamping arrangement for the sealing member, as shown in Fig. 3, in which event some of the fingers may be fashioned to provide the snap-on arrangement with the lower race, while some of the fingers may be fashioned to bite into the sealing member. Also in this form the collet and the upper race comprise one single piece of metal having a race portion 10a and a collet portion 12a. This combined collet and race may be constructed to place the balls under compression between the upper and lower races.

When these valves are closed the sealing member comes against the seat 2 and the stem rotates without relative rotation between the sealing member and seat. This obviously prolongs the life of the sealing member. When the valve is opened the sealing member and the elements of the antifriction bearing structure are all in snug relationship, due to the slight tension of the races upon the balls, so that vibration tendencies are eliminated, or in any event substantially minimized. In this connection, of course, the screw 8 is applied to the stem until the collet is tightly engaged between the head of the screw and the end of the stem 3.

In some of the claims appended hereto elements are recited including the two race members and the collet. This is intended to cover both the form where the collet is a separate element and the form where the collet is integral with one race.

I claim:

1. In a valve having a seat and a control stem mounted on threads for rotary movement toward and away from the seat, a sealing member and antifriction mounting therefor comprising, a race disposed adjacent the end of the stem, a second race, balls between the races, a collet having one end associated with one race and the other end connected to the other race for holding the races and balls in assembly, a screw extending through the collet and threaded into the stem for clamping the collet to the stem, and a sealing member secured to the second race for closing the seat.

2. In a valve having a seat and a control stem mounted on threads for rotary movement toward and away from the seat, a sealing member and antifriction mounting therefor comprising, a race disposed adjacent the end of the stem, a second race, balls between the races, a collet rotatably connecting the races and for holding the races and balls in assembly, a screw extending through the collet and threaded into the stem for clamping the collet to the stem, a sheet metal cap having a rubber sealing member bonded thereto and means securing the cap to the second race in a position so that the cap covers the screw.

3. In a valve having a seat and a control stem mounted on threads for rotary movement toward and away from the seat, a sealing member and antifriction mounting therefor comprising, a race disposed adjacent the end of the stem, a second race, balls between the races, a collet having one end associated with one race and the other end connected to the other race for holding the races and balls in assembly, a screw extending through the collet and threaded into the stem for clamping the collet to the stem, a sheet metal disc, a sealing member secured to one side thereof, means securing the disc to the second race, said disc having a depression for clearing the head of the screw.

4. In a valve having a seat and a control stem mounted on threads for rotary movement toward and away from the seat, a sealing member and antifriction mounting therefor comprising, a race disposed adjacent the end of the stem, a second race, balls between the races, a collet having one end associated with one race and the other end connected to the other race for holding the races and balls in assembly, a screw extending through the collet and threaded into the stem for clamping the collet to the stem, a cap member in the form of a disc fitted to the underside of the second race and having fingers for engaging the periphery of the second race, and a sealing member secured to the cap.

5. In a valve having a seat and a control stem mounted on threads for rotary movement toward and away from the seat, a sealing member and antifriction mounting therefor comprising, a race disposed adjacent the end of the stem, a second race, balls between the races, a collet for holding the races and balls in assembly, a screw extending through the collet and threaded into the stem for clamping the collet to the stem, a sheet metal cap member having a plurality of fingers extending from its outer edge, said cap member being fitted against the second race, some of the fingers being fashioned over the second race member, a sealing member on one side of the cap and some of the fingers being fashioned to hold the sealing member to the cap.

6. In a valve having a seat and a control stem mounted on threads for rotary movement toward and away from the seat, a sealing member and antifriction mounting therefor comprising, a race disposed adjacent the end of the stem, a second race, balls between the races, a collet for holding the races and balls in assembly, a screw extending through the collet and threaded into the stem for clamping the collet to the stem, a sheet metal cap having fingers extending from its peripheral edge and fashioned to provide spring arms which are snapped over the second race, and a sealing member secured to the cap.

7. In a valve having a seat and a control stem mounted on threads for rotary movement toward and away from the seat, an integral race and collet with the race portion positioned adjacent the end of the stem and the collet disposed axially thereof, a second race held in position by the collet, a plurality of balls between the races, a headed screw passing through the collet and threaded into the stem, a cap member secured to the second race and a sealing member secured to the cap member.

8. In a valve having a seat and a control stem mounted on threads for rotary movement toward and away from the seat, an integral race and collet with the race portion positioned adjacent the end of the stem and the collet disposed axially thereof, a second race held in position by the collet, a plurality of balls between the races, a headed screw passing through the collet and threaded into the stem, and a sealing member secured to the second race.

TERENCE G. HARE.